Inventor
BENNO SCHWARZ
By
Attorney

May 26, 1953            B. SCHWARZ            2,640,178
SPEED AND VOLTAGE CONTROL OF STATOR FED ALTERNATING
CURRENT COMMUTATOR MOTORS AND FREQUENCY CONVERTERS
Filed Jan. 31, 1951            3 Sheets-Sheet 2

*Inventor*
*Benno Schwarz,*

*Attorney*

May 26, 1953 B. SCHWARZ 2,640,178
SPEED AND VOLTAGE CONTROL OF STATOR FED ALTERNATING
CURRENT COMMUTATOR MOTORS AND FREQUENCY CONVERTERS
Filed Jan. 31, 1951 3 Sheets-Sheet 3

Inventor
Benno Schwarz,

By

Attorney

Patented May 26, 1953

2,640,178

UNITED STATES PATENT OFFICE 2,640,178

SPEED AND VOLTAGE CONTROL OF STATOR FED ALTERNATING CURRENT COMMUTATOR MOTORS AND FREQUENCY CONVERTERS

Benno Schwarz, Norwich, England

Application January 31, 1951, Serial No. 208,767
In Great Britain February 7, 1950

7 Claims. (Cl. 318—244)

The invention is concerned with the speed and voltage control of A. C. commutator machines a stator winding of which is connected to the supply. Such machines can be used as motors producing mechanical outputs at their shaft at variable speed, or, as frequency converters producing electrical output of variable frequency and voltage at slip rings electrically connected to the rotor winding, or to one of the rotor windings where more than one rotor winding is provided.

Whether used as a motor or as a frequency converter, the speed of the A. C. commutator machine can be adjusted by supplying the commutator brushes of said machine with a variable voltage, or, more generally expressed, by providing a variable ratio of the voltages applied respectively to the commutator and to the stator winding of the machine.

Induction regulators, or other variable voltage transformers, are used for providing a variable and adjustable voltage for either or both the commutator and the stator winding of such machine.

Apart from providing variable and adjustable voltages, such induction regulators or other variable voltage transformers fulfill in general also other functions.

They serve as step-down transformers for the supply voltage to obtain in the rotor circuit of the A. C. commutator machine a suitable voltage based on the known design and commutation considerations.

Moreover, they enable the rotor circuit to be so arranged that, for instance, three open phases are obtained, allowing a 6-phase feeding of the commutator, with the consequent advantage of lower currents per brush arm, and of lower losses and less heating in the rotor winding.

Furthermore the induction regulator either by itself, or in combination with an auxiliary winding in the motor stator or the secondary winding of a separate transformer, may provide a voltage component at right angles to the speed adjusting variable voltage, for the purpose of phase compensation of the rotor current which is essential for the correct performance of many A. C. commutator machines.

In the known arrangements the full power input to the rotor of the commutator machine has to be transformed from the stator supply voltage to the rotor supply voltage, and this transformation is effected by means of the induction regulator and/or between stator windings of the commutator machine or a combination thereof, or a combination including a further transformer.

Moreover, a further transformation is required where the supply is a high tension supply which is too high to be directly connected to either or both the stator winding of the commutator machine and the primary winding of the induction regulator.

The principal object of the present invention is to adapt a supply transformer so that it fulfills the several functions above set forth, whilst at the same time enabling the size of the induction regulator and other windings included in the arrangement or system to be considerably reduced.

Other objects of the invention are to obtain phase conversion between the supply on the one hand and the stator and rotor circuits of the A. C. commutator machine on the other hand, without the necessity of transforming the output in the induction regulator or other variable voltage transformer, and to obtain phase compensation without the use of additional windings.

With these and other objects in view as will appear as the description proceeds, the invention consists in the novel combinations and arrangements of elements herein set forth and electrically interconnected as hereinafter described, and as defined in the appended claims.

The examples shown diagrammatically in the accompanying drawings of arrangements according to the invention illustrate the principle underlying the invention, and its execution and the result obtained.

In the accompanying diagrammatic drawings:

Figure 1a shows the voltage vector diagram and Figures 1b and 1c current vector diagrams applying to the arrangement of Figure 1.

Figures 1, 1A:
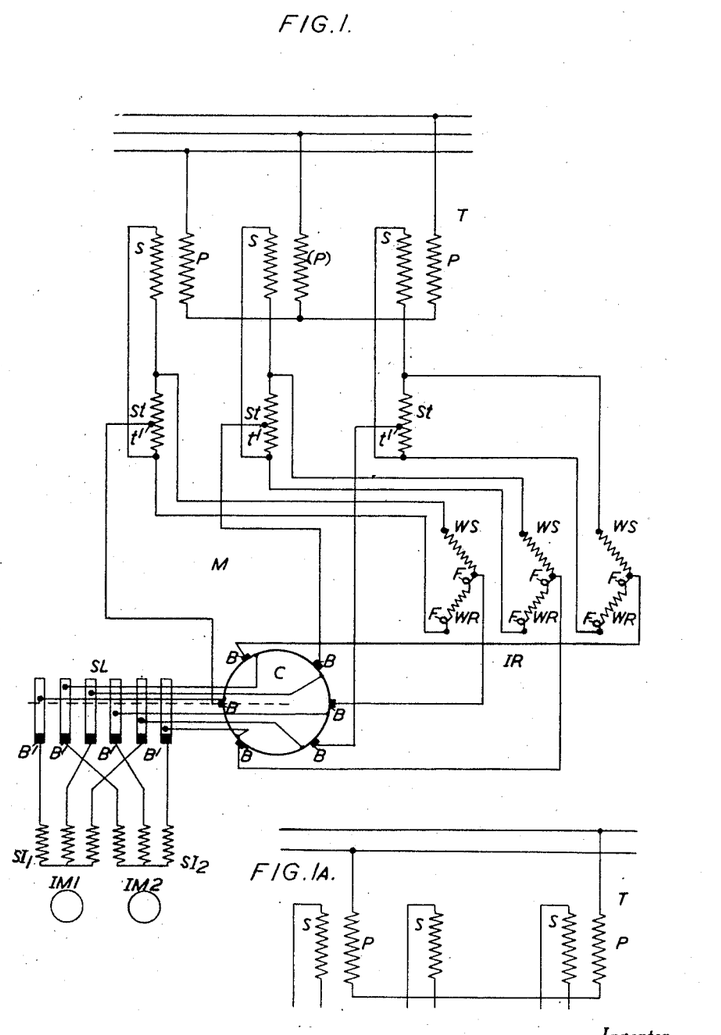
Figure 1 shows an example of an arrangement according to the invention applied to a self-propelling frequency converter utilised for the voltage and speed control of A. C. induction motors.
Figure 1A shows the upper part of Figure 1 modified to provide for operation with single phase supply.

In the arrangement shown in Figure 1, M is an A. C. commutator machine having a stator winding St and a wound rotor with a commutator indicated as a whole by the letter C.

The commutator machine M is used as a frequency converter or frequency changer for supplying induction motors IM1 and IM2 with a voltage of variable and adjustable magnitude and frequency for the speed control of said motors.

For this purpose the rotor C of the commutator machine M is also provided with slip rings SL to which tappings in the rotor winding, or one of the rotor windings are connected.

The induction motors IM1, IM2, may be squirrel cage motors as indicated diagrammatically in Figure 1, or they may be slip-ring motors. Moreover, instead of induction motors, they may be synchronous motors. Any suitable number of such motors can be used, and they are preferably so connected to the slip rings SL of the frequency converter M, that a symmetrical current loading is obtained in the rotor winding of the frequency converter.

T represents a transformer having its primary P connected to a 3-phase A. C. supply system of any voltage.

In the case of a single phase supply, referred to below, one of the primary winding phases for instance the phase P in Figure 1, is omitted, as shown in Figure 1A.

The secondary winding S of the transformer T has three open phases which are connected at one end to the ends of the three separate phases of the stator winding St of the commutator machine M and at the other end to the three separate phases of windings WS and WR of a single core induction regulator IR having stator and rotor units each provided with winding slots therein to receive the windings, the secondary winding S of the transformer thus feeding the regulator IR.

The winding WS which may be the stator winding of the induction regulator IR, and the winding WR which may be its rotor winding (flexible connections F being provided for the latter) are connected together in each phase, so that the voltages of these windings are geometrically additive and equal and opposite to the applied voltage produced by the secondary winding S of the transformer T.

The stator windings SI1 and SI2 of the induction motors IM1 and IM2 are connected by brushes B' to the six slip rings SL of the frequency converter M, and the six commutator brushes B in contact with the commutator of said converter provide six-phase feeding of the rotor of the converter, Figure 1 showing a schematic diagram of a 2-pole machine.

Whilst three of the commutator brushes B are as shown, connected to the points of connection between the induction regulator windings WS and WR, the other three commutator brushes B are connected to tappings $t'$ in the stator winding St of the commutator machine M.

The stator winding St has two winding sections in each phase represented diagrammatically in the figure by the part between the top end and the connecting point or tapping $t'$, and the part between the bottom end and the point or tapping $t'$, respectively. In order to provide for minimum leakage between these two winding sections they are accommodated in the same slots of the stator core in a similar manner to that of the sections of a two-layer winding, one section occupying a bottom position in the slots under one pole and a top position under the next pole, whereas the other section occupies a top position in the slots under the first mentioned pole and a bottom position under the next pole, the point $t'$ representing the connection between the two winding sections. The term "tapping" as applied to the stator winding St of the commutator machine is intended to mean the connection between the two separate sections of each winding phase of the stator winding St.

Figures 1A, 1B, 1C:
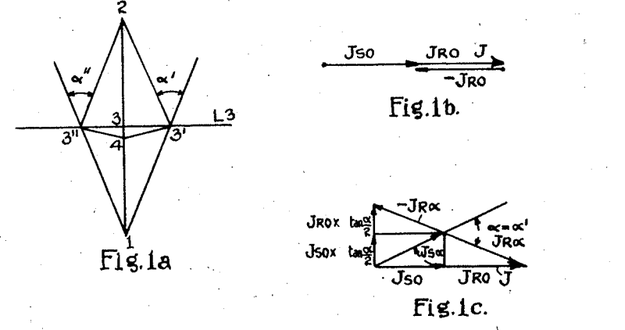

The vector diagram in Figure 1a shows the voltages obtained and the vector diagrams Figures 1b and 1c show the currents flowing in the circuit.

In Figure 1a, the vector 1, 2 may represent the voltage of the secondary winding S of the transformer T.

Assuming that the number of turns in the regulating windings WS and WR is the same then the voltages induced in them by the common flux must also be equal.

If the relative position of the stator and rotor of the induction regulator IR is such that connected winding phases of WS and WR are electrically co-axial, then the vectors 1, 3 and 3, 2 represent respectively the voltages in these windings.

By displacing relatively the rotor and stator of the induction regulator IR by the electrical angle $a'$, the vector 1, 3 assumes the vectorial position 1, 3'. The horizontal straight line L3 represents the locus of the vector ends for different displacement angles $a$.

As the tappings $t'$ in Figure 1 are in the centre of the stator winding St, the vectors 1, 3 ad 3, 2 also represent the voltages of the parts of that winding, and each pair of brushes B belonging to one phase on the commutator of the frequency converter M will be fed with the voltage represented by the vector 3, 3' in accordance with the displacement angle $a'$ of the induction regulator IR. The voltage supplied to the commutator will be zero for $a=0$, and the commutator machine or frequency converter M will operate at synchronous speed.

Provided that the position of the brushes B on the commutator C is such that the vectorial position of rotor voltage coincides with the straight line L, the voltage component 3, 3' obtained with a displacement angle, $a'$ will produce a speed difference either in the hyper-synchronous or sub-synchronous direction. The vectorial position of the rotor and speed adjusting voltages (e. g. 3,3') is at right angles to the voltage 1,2 of the windings S and St connected in the same phase circuit. It will be seen that each of these phase circuits is self-contained and that they are separated from each other outside of the rotor winding of the commutator machine M, and also that the number of phases in the windings S, St and WS, WR are the same.

If the displacement $a'$ in Figure 1a is assumed to result in a sub-synchronous speed, the displacement $a''$ of the regulator IR resulting in the introduction into the rotor circuit of the commutator machine of a voltage represented by the vector 3, 3'' will produce a speed above synchronism.

If, moreover, the position of the tapping $t'$ in the winding St, is so chosen that the voltage of that winding is divided as indicated by the vectors 1, 4 and 4, 2 in the vector diagram Figure 1a, the voltage introduced into the rotor circuit of the commutator machine M in the co-axial position of the induction regulator IR ($a=0$), will not be zero as before but will be represented by the vector 4, 3. With a displacement angle $a'$ the voltage applied to the commutator brushes B will be represented by vector 4, 3' and so forth, i. e. the constant voltage component 4, 3 will be existent independent of the displacement angle of the induction regulator IR and as 4, 3 is at right angles to the speed adjusting components 3, 3', 3, 3'', etc., it can be utilised to obtain phase compensation of the rotor current and power factor correction of the arrangement.

In the current vector diagram Figure 1b, J indicates the current in the rotor circuit which is assumed to be in phase with the speed adjusting voltage 3, 3' in Figure 1a and therefore a power current not containing a wattless component for the purpose of facilitating the understanding, but the results are equally applicable to any phase position of the current.

In the "neutral" position of the induction regulator IR ($a=0$), the currents in the windings WS and WR of the regulator can be represented by the equal current vectors $J_{SO}$ and $J_{RO}$ on the assumption made that the number of turns in these windings are equal.

Whilst the currents $J_{SO}$ and $J_{RO}$ are of the same magnitude and additive in the outside circuit, one of these currents has to be considered reversed (for instance $-J_{RO}$ in Figure 1b) with reference to the internal circuits of the induction regulator IR in which there must exist balance of the magnetomotive forces produced by the stator and rotor winding.

The same balance of magnetomotive forces exist also with regard to the same currents in the stator winding St. This means that these currents are flowing in opposite directions from the tapping or electrically-central connection points $t'$ in the parts of the winding on both sides of the tapping point $t'$.

There will be no current flowing in the secondary winding S of the transformer T in Figure 1 and therefore, also no current flow in the primary winding P.

This is consistent with the fact that the resulting voltage produced in the induction regulator IR is zero in the neutral position $a=0$, and therefore the input into the commutator of the commutator machine or frequency converter M and the output delivered by the slip rings SL of the frequency converter M is zero as well.

At the same time the frequency at the slip rings SL of the commutator machine M is zero, and the induction motors IM1 and IM2 will remain at standstill.

A small angle $a$ will already produce a resulting voltage in the commutator circuit of the commutator machine M, and, neglecting secondary effects, the same voltage on the slip rings SL, the latter of a low frequency, with the result that the induction motors IM1 and IM2 take a considerable current from this low voltage low frequency supply, which is only limited by the ohmic resistance of their windings. The torque so developed on the shafts of the induction motors is obtained with a small current flowing in the primary winding of the transformer T, as will become clear from the current vector diagram Figure 1c, by visualising the angle $a$ to be very small.

In the current vector diagram Figure 1c, the currents are represented for a displacement angle $a=a'$ of the induction regulator M, i. e. in accordance with the speed regulating voltage vector 3, 3' in the voltage vector diagram Figure 1a.

The vector diagram Figure 1c is based on the same rotor current J as in Figure 1b. The currents in the windings WS and WR of the induction regulator IR are represented by the vectors $J_{S_a}$ and $J_{R_a}$ which are displaced in relation to one another by the displacement angle $a'$. Their vectorial sum is J in the external circuit, whereas in the internal induction regulator circuit one of the currents has to be considered reversed in its vectorial direction $(-J_{R_a})$.

The individual currents flowing in the regulator windings $J_{S_a}$ and $-J_{R_a}$ can each be considered as consisting of two vector components at right angles as shown in Figure 1c.

Referring now to the tapped winding St the currents $J_{S_a}$ and $J_{R_a}$ flow in the two parts on both sides of the tapping $t'$. Their components $J_{SO}$ and $-J_{RO}$ respectively which are equal and opposite, will cancel their magnetic effect as described in connection with Figure 1b.

The current component $$J_{SO} \times \tan \frac{\alpha}{2} = J_{RO} \times \tan \frac{\alpha}{2}$$

flows through the whole tapped winding and also through the untapped winding. The current in the primary winding P of the transformer T will take from the supply only a current proportional to the current $$J_{SO} \times \tan \frac{\alpha}{2}$$

This again is consistent with the energy balance in the system which supplies to the commutator C and from the slip rings SL of the commutator machine M to the induction motors IM1, IM2 a current J and a voltage 3, 3' (at the slip rings at low frequency) and takes from the supply, an input represented by a current vector $$J_{SO} \times \tan \frac{\alpha}{2}$$

at a voltage represented by voltage vector 1, 2, this input voltage and current again being in phase with one another though at right angles to the vectors representing the rotor circuit current and voltage of the same "phase" i. e. of the same electrically connected circuits. The actual energy transfer from one to the other of these "phase" systems takes place in the induction regulator IR due to the relative electrical and local displacement of its stator and rotor winding phases belonging to different separate "phase" systems.

Superimposed on these currents is the load current required in the stator winding St to produce the torque developed at the shaft of the commutator machine if this is used as a motor. This "torque" current is not shown in the vector diagrams for the sake of clarity, and those versed in the art will not find any difficulty in tracing it.

The advantages obtained by the auto-transformer connections employed in the arrangement will be readily appreciated as the minimum of windings and their current loadings are obtained.

The total transformation of the output required in the known arrangements of this kind where separate rotor and stator circuits are employed for the commutator machine, are avoided in the above described arrangement and other arrangements according to the invention hereinafter described.

In the usual arrangement such transformation takes place between the separate primary and secondary windings of the induction regulator and/or between the secondary and primary windings in the stator of the commutator machine.

The above described arrangement by using a combined stator and rotor circuit, reduces the total size of the windings, with consequent reduction of size, weight and of losses and reactive voltage drops in all parts of the equipment.

Moreover in the example, above described magnetising current and iron losses of the induction regulator, copper losses in all circuits, and ohmic and reactive voltage drops are reduced every where within the speed range from the value incurred at the extremes of the speed range with a minimum value in the neutral position of the induction regulator IR, which position is defined by the displacement angle $a = 0$.

Considering the commutator machine M in the first place connected to a 3-phase supply, it will, as explained above operate at a speed which is determined by the adjustment of the induction regulator IR i. e. by the voltage component indicated vectorially as 3, 3', 3, 3'', etc. in Figure 1a.

In accordance with the adjusted speed of the commutator machine M there will appear at the slip rings SL a voltage supplied to the stators SI1, SI2 of the induction motors IM1 and IM2, which is proportional in magnitude and frequency to the difference between the synchronous speed of the commutator machine and its actually adjusted speed.

The induction motors IM1, IM2 will operate at a speed which is determined by the frequency of their supply voltage, which, in connection with their number of poles, defines their synchronous speed.

Their actual speed will then be determined by their slip, due to their loading.

The magnetomotive force produced in the rotor winding or windings of the commutator machine M by the slip ring currents and the magnetomotive force produced by the commutator current essentially balance one enother, and there is therefore no load current in the stator winding St of the commutator machine acting as a frequency converter M. This also becomes clear from the consideration that this machine does not develop any torque apart from the torque required to provide for the friction and windage losses of the rotating parts. Consequently the current vector diagrams Figures 1b and 1c will apply if windage and friction losses are neglected.

The only other currents flowing will be magnetising currents of the frequency converter M and induction regulator IR the distribution and magnitude of which can be adjusted by the introduction of a voltage component at right angles to the rotor voltage as exemplified by the vectors 4, 3 in the voltage vector diagram 1a.

The copper losses in the rotor are reduced to a fraction of the losses that would be incurred with the same rotor current for motoring operation of the commutator machine M, assuming one rotor winding only, to which both the commutator C and the slip rings SL are connected, as schematically shown in Figure 1.

The commutator machine M used in the described manner as a frequency converter is, in view of the above considerations, of a considerably smaller size than a motor of the same output.

The commutator machine M functioning as a frequency converter is, as will have become clear from the above explanations, self-propelling and self-containing for the purpose of frequency and voltage adjustment at its output side.

The fact that no load current of the first order flows in the stator winding of the commutator machine M renders the commutator machine M, in use as a frequency converter particularly suitable to act at the same time as a phase converter.

In the case of a single phase supply, as shown in Figure 1A for instance, for application of the system to traction the transformer T is a three-legged transformer and the primary winding on one core or leg of the transformer T in Figure 1, for example that on the middle core or leg P is omitted as shown in Figure 1A so that only the outer legs carry a primary winding the middle leg having only the secondary winding S so as to produce a symmetrical 3-phase flux in the transformer through the phase-converter action of the commutator machine.

As soon as the rotor of the commutator machine M rotates, a rotating field is produced in the machine M and this rotating field induces in the 3-phase stator winding St, practically symmetrical 3-phase voltages which in their turn are applied to the 3-phase secondary winding S of the transformer T and to the 3-phases of the induction regulator windings WR, WS.

The last described effect obtained on rotation of the rotor of the commutator machine or frequency converter M results in the whole arrangement operating (apart from secondary effects) in the same way as if it were supplied from a 3-phase supply.

The transfer of energy into that winding phase in the stator St which is connected to the secondary winding phase of the transformer T, having the primary winding phase omitted (i. e. the middle phase in the example, Figure 1A) is brought about through the rotating rotor of the frequency converter M.

The fact that the stator winding St of the frequency converter M is not loaded by any major currents resulting from the multiphase operation as explained above (and the same is true for its rotor winding), enables this machine to be utilised to the best advantage as a phase converter, reducing to the minimum the voltage drops which cause dis-symmetries of the multi-phase system. The phase converter effect is, moreover, assisted by the action of the motors IM1 and IM2 fed from the slip rings SL which also act as phase converters is consequence of their own rotation.

It will be realised that the phase converter effect depends on the rotational speed of the frequency converter, and is, therefore, a maximum when said converter rotates near its synchronous speed, i. e. when it produces on its slip rings SL a low frequency.

This is the condition in which the induction motors IM1, IM2 connected to the slip rings SL have to start and to develop the maximum torque, particularly for traction applications.

The practically perfect symmetry of the rotating field obtained under this condition permits starting and slow running torques of the induction motors IM1 and IM2 to be obtained in line with their full capacity as multi-phase motors, and this is important for economical as well as weight considerations.

With reduced speed of the frequency converter

M and therefore, relatively reduced effectiveness of the phase splitting effect, the increased frequency produced at the slip rings SL causes the induction motors IM1 and IM2 to run at a high speed so that their phase conversion effect increases, with the result that also under these operating conditions the voltages at the slip rings SL of the frequency converter M constitute a practically symmetrical multi-phase system with balanced currents in the stator windings SI1, SI2 of the induction motors.

For the purpose of starting the commutator machine M from standstill when fed from a single phase supply, a resistance or capacitor may be introduced into one of the stator and rotor phase systems.

Alternatively starting of the commutator machine from standstill, under such conditions can be carried out by means of a "pony" motor (auxiliary starting motor, which is disconnected from its supply at a speed sufficient to result in self-propelling and phase converter action for the operation of the system).

The system of the invention enables voltage components to be introduced into the rotor circuit on the commutator side in a simple and economical way in the vectorial direction of the rotor voltage for producing a speed adjusting effect.

For this purpose it is immaterial whether the supply system is single phase or multi-phase, as in line with the above explanations a multi-phase system is in any case established by the rotation of the rotor of the frequency converter M.

The introduction of a voltage component in the speed adjusting direction, i. e. in the direction of the locus L3 in the voltage vector diagram Figure 1a is advantageous if the commutator machine M has to operate in the sub-synchronous or in the hyper-synchronous range only.

As explained above in connection with the voltage vector diagram Figure 1a, the induction regulator IR is capable of producing a speed adjusting voltage component in the speed increasing and speed decreasing direction, in relation to the synchronous speed, which adjustment applied to the frequency converter M means a reversal in the direction of phase rotation on the slip rings SL at synchronous speed when slip ring voltage and frequency pass through zero.

Whilst this can be utilised for reversing the direction of rotation of the induction motors IM1 and IM2, such reversal can also be obtained by switching means in the usual way for this purpose in connection with multi-phase motors.

In the latter case the frequency converter is used, for instance, in its sub-synchronous range only, and the introduction of a fixed speed decreasing voltage component, i. e. in the direction of the vectors 3, 3' in Figure 1a, enables the output and size of the induction regulator IR to be reduced to approximately half by utilising its voltage range in both directions, the adjustment of the regulator to its neutral position $a=0$ occurring approximately half-way between the synchronous and the bottom speed of the frequency converter M, i. e. in the middle of the voltage and frequency range.

Figure 2:
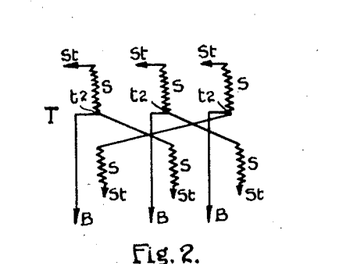
Figures 2 and 3 show alternative examples of secondary winding connections of the transformer in accordance with the invention.
Figure 3:
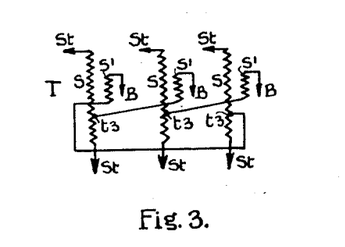

Figures 2 and 3 show two examples of arrangements of the secondary winding of the transformer T, for producing a speed adjusting voltage component.

In Figure 2 the transformer secondary winding S is connected in zig-zag. The primary winding (not shown) can be connected either in star or in delta.

Figure 2A:
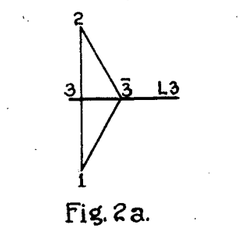
Figures 2a and 3a show voltage vector diagrams of the transformer secondary windings in accordance with Figures 2 and 3, respectively.
Figures 4, 4A:
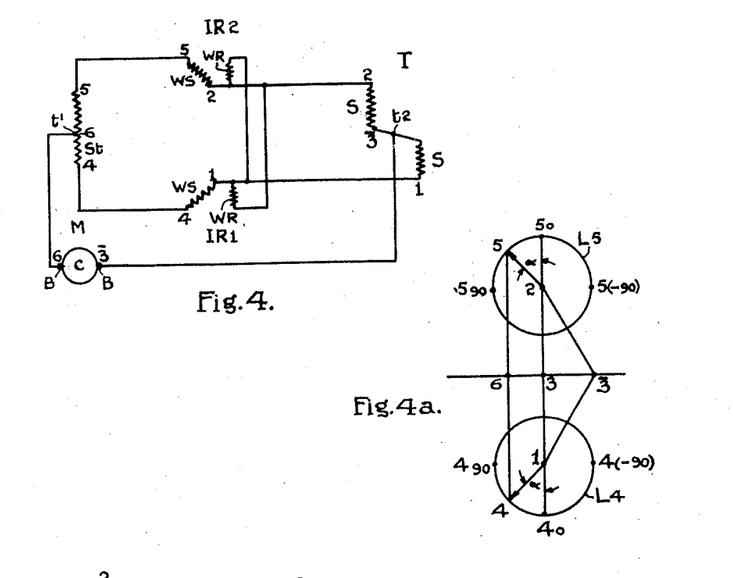
Figure 4 shows an example of an arrangement according to the invention in which combined stator and rotor voltage regulation is applied to a commutator machine.
Figure 4a shows the voltage vector diagram of the arrangement according to Figure 4.
Figure 5:
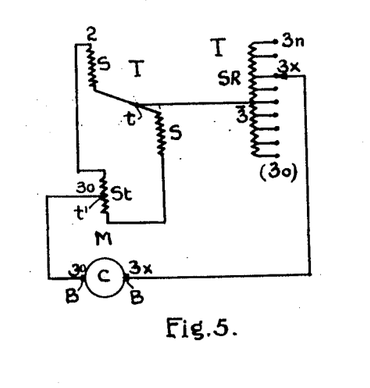
Figure 5 shows an arrangement according to the invention in which a tapped transformer winding is used for the voltage regulation in the rotor circuit of a commutator machine.

As shown in the voltage vector diagram, Figure 2a, the secondary voltage 1, 2 is produced by two voltage components 1, $\overline{3}$ and $\overline{3}$, 2, respectively, produced by the half coils of the transformer secondary winding S (Figure 2), on different cores of the transformer, the voltage represented by the voltage vector, 3, $\overline{3}$ at right-angles vectorially to vector 1, 2 serving as the speed adjusting voltage component, as will be shown in connection with the examples of Figures 4 and 5.

In order to relate the transformer secondary winding S shown in Figure 2 to any of the other examples illustrated, arrow-heads marked St are used in Figure 2 to indicate the connections to the stator winding St, which connections may be direct as shown in Figure 5 or through another winding WS as shown in Figure 4; and arrow-heads marked B are used to indicate connections to the commutator brushes of the commutator machine M which connections may be direct as in Figure 4 or through another winding SR as in Figure 5.

In Figure 3 the transformer is shown provided with another secondary winding the coils S' of which are arranged on the respective cores of the transformer, one end of each coil S' being connected to a suitably chosen tapping point $t3$ in each winding phase of the secondary winding S of the transformer.

Figure 3A:
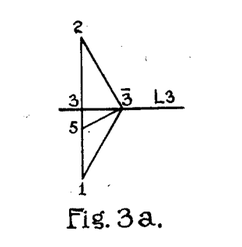

The corresponding vector diagram is shown in Figure 3a in which 1, 2 represents the voltage of the secondary winding phase S providing the supply to the stator winding St and the regulator IR as in Figure 1.

5, $\overline{3}$ represents the voltage produced by the coils S' of the additional transformer secondary winding, the tappings $t3$ in the transformer winding S being so arranged that the vector end $\overline{3}$ assumes a symmetrical position, falling on the locus L3 i. e. 3, $\overline{3}$ being at right-angles to 1, 2.

The vector 3, $\overline{3}$ is in this case again a speed decreasing voltage component.

The arrow-heads St and B in Figure 3 have the same significance as the arrow-heads St and B in Figure 2, and the above explanation thereof with reference to Figure 2 applies also to Figure 3.

If, for design reasons, for instance in order to reduce the commutator current per brush arm, and consequently the commutator length and also the losses in the rotor winding of the frequency converter, six open phases are provided for the feeding of the commutator and both of the secondary winding connections shown in Figures 2 and 3 can be employed i. e. three of each to give a correct six phase system with 30° phase displacement between subsequent phases.

Any other number of phases on the commutator and slip ring side of the commutator machine M can, however, be utilised in connection with the arrangements according to the invention with and without introduction of speed adjusting voltage components.

Figure 4 illustrates an example of another arrangement providing for simultaneous voltage regulation of the commutator machine M in both its stator and rotor circuits.

Such a combined system of regulation has a number of advantages especially in applications of the invention where the required torque of the commutator machine M, or in the case where said machine is used to function as a frequency converter, the required torque of the multi-phase motors supplied from the frequency converter, is not constant over the speed range.

In the latter case by adopting such combined stator and rotor voltage regulation, it is possible to compensate for the effect of the ohmic voltage drop in the circuit at low frequencies at which this effect is more marked in view of the low voltages accompanying the low frequencies.

Another advantage of combined rotor and stator voltage regulation is that the stator voltage and with it the flux of the commutator machine M, can be reduced with increasing rotor frequency, thereby reducing the voltage between adjacent commutator bars, which, as is well known, is an important limiting feature of the design of commutator machines.

In the case where the commutator machine M functions as a frequency converter to feed variable speed induction motors applied for example to traction purposes, the higher ratio between voltage and frequency at low frequencies as compared with the voltage frequency ratio at high frequencies obtainable by the combined rotor and stator regulation can be, with advantage, utilised for obtaining high starting and operating torques at low speeds, whilst at high speeds where such high torques are not required, the commutator voltage and with it the voltage between the commutator bars is relatively reduced and commutation improved.

In the schematic diagram of Figure 4 the same lettering is applied as in Figure 1 as far as applicable.

Only one phase of the rotor and stator circuit of the commutator machine M is shown in this figure for simplification purposes, and for the same purpose the primary winding of the transformer and the slip rings of the rotor are omitted from the figure.

The secondary winding S of the transformer T, in Figure 4 is connected in zig-zag similarly as in Figure 2 the connection points $t2$ being connected to one brush B of the commutator machine M, and the other brush, of the same phase, being connected to the tapping $t'$ of the stator winding S$t$ of said commutator machine M.

Two single core induction regulators IR1 and IR2, are provided, the rotors of which can be mounted on a common shaft or coupled together mechanically in any suitable manner.

These induction regulators are electrically connected in auto-transformer connection in the circuit of the system with their primary windings WR which may be their rotor windings connected to the fixed voltage supply from the transformer secondary winding S and their secondary windings WS, which are then their stator windings connected in the circuit of the stator winding S$t$ of the commutator machine M.

The rotor windings WR of the induction regulators could, however, be connected in circuit on the other side of their stator windings WS to that shown in the figure, as will be readily understood by those skilled in the art, without illustration.

The voltage vector diagram Figure 4a illustrates vectorially how the combined rotor and stator voltage regulation is obtained in accordance with this sample of the invention.

In order to assist the understanding of the arrangement the figures used for the voltage vectors in the voltage vector diagram Figure 4a are introduced also in Figure 4 to mark the points of the circuit where the different voltage potentials occur.

In the vector diagram Figure 4a, the vector 1, 2 indicates the resulting voltage produced by one phase of the transformer secondary winding S i. e. the voltage between the points 1 and 2 in Figure 4. This is composed of the voltage vector components 1, $\overline{3}$ and $\overline{3}$, 2 such voltage components being produced by the two parts of the winding S accommodated on different cores of the transformer.

The single induction regulator IR1 produces in its secondary winding WS a constant voltage represented by the vector 1, 4 (Figure 4a) as its primary winding WR is connected to a constant voltage supply. In accordance with the displacement angle $\alpha$ between the primary and secondary of the regulator IR1 (such angle being adjustable), the locus of the vector end 4 is a circle L4 as indicated in Figure 4a.

The same consideration applies to the vector end 5 of the secondary voltage vector 2, 5 of the induction regulator IR2 (locus L5). The displacement angle $\alpha$ is the same for both induction regulators but opposite in relation to the rotating field.

The voltage applied to the stator winding S$t$ of the commutator machine with a displacement angle $\alpha$ for the regulator, is represented by the vector 4, 5 and this is halved by the tapping $t'$ in the stator winding S$t$ of the commutator machine. The brushes B belonging to one phase of the rotor of the commutator machine M are fed with a voltage $\overline{3}$, 6 which for the purpose of this explanation may be in a speed reducing direction, i. e. for imparting a sub-synchronous speed to the commutator machine M.

The ratio between the voltage 4, 5 applied to the stator winding S$t$ and the voltage $\overline{3}$, 6 applied to the rotor C of the commutator machine M determines the speed adjustment of said commutator machine.

This will become clear from the consideration that the voltage represented by the vector 4, 5 determines the magnetic flux of the machine, and (taking into consideration the transformation ratio between the stator and rotor winding) the standstill voltage at the brushes B. The ratio between the applied voltage $\overline{3}$, 6 and the standstill voltage at the brushes B equals $$Sr = \frac{\text{synchronous speed minus actual speed}}{\text{synchronous speed}}$$

The frequency in the rotor of the commutator machine M (which frequency also appears at its slip rings when the machine is used as a frequency converter), is proportional to $Sr$ and the voltage under the same conditions is proportional to $Sr \times \phi$, where $\phi$ is the flux of the machine, which flux in turn is proportional to the stator voltage.

In view of the above it can be seen that the arrangement according to Figure 4 can be utilised to obtain a varying ratio between voltage and frequency at the slip rings SL of the frequency converter to suit the requirements of different drives served by A. C. motors fed from the slip rings SL.

If, for instance, the voltages are chosen as in the example of Figure 4a so as to make the regulator secondary voltages 1, 4 and 2, 5 equal to 3, $\overline{3}$, an adjustment of the regulator to $\alpha = -90°$ so as to obtain the vector ends $4_{(-90)}$, $5_{(-90)}$, respectively, the effective voltage introduced into the rotor circuit becomes zero, and the commutator machine M will run at synchronous speed with a flux which is proportional to $4_{(-90)}$, $5_{(-90)}$.

The maximum flux will be obtained when the angle $a=0$, the vector ends being in the position $4_0$ and $5_0$. With this adjustment the speed adjusting rotor voltage is $3, \overline{3}$ and the ratio between slip ring voltage and slip ring frequency will be a maximum, resulting in a maximum torque overload capacity of the induction motors fed from the slip rings SL.

As applied for example, to traction motor control the adjustment of the induction regulators from $a=-90$ where there is no voltage and frequency at the slip rings SL, to $a=0$, will result in the production at the slip rings SL of a voltage which increases more rapidly than the frequency with consequent high starting and running torques of the induction motors fed from the slip rings SL of the machine M. At low speeds of the induction motors the voltage/frequency ratio remains almost constant over a considerable angle on both sides of $4_0$, $5_0$ (Figure $4a$) as in this region the stator voltage $5, 4$ only changes comparatively little.

By adjusting the induction regulators still further the applied rotor voltage $\overline{3}, 6$ increases whilst the applied stator voltage $4, 5$ decreases. This results in a decrease of speed of the frequency converter M and consequent increase of frequency at the slip rings SL, so causing the induction motors fed from the slip rings SL to increase their speed.

At the displacement angle $a=90°$ of the induction regulators the voltage vector ends $4, 5$ arrive at the positions $4_{90}$ and $5_{90}$, respectively (Figure $4a$). This represents a condition of maximum rotor voltage which is twice the amount of the secondary voltage of the induction regulators.

In the last part of this movement of the induction regulators the applied rotor voltage changes but little and the speed variation is mainly due to the decrease of stator voltage.

This is consistent with the requirement of a traction drive where only reduced torques are desired at high motor speeds and the reduction of flux in the traction motors is not only permissible but useful for obvious reasons.

At the same time the rotor voltage is limited, and thereby the voltage between adjacent commutator bars considerably reduced at low speeds as compared with an arrangement based on constant stator voltage and flux of the commutator machine M.

The invention is of course not limited to the particular arrangement of regulator and connection diagrams as shown in the examples nor to the vectorial quantities as exemplified by different voltage and current diagrams.

Similarly the choice of the absolute and relative amounts of these quantities over the speed range of the commutator machine M is a matter of design in executing the invention to the best advantage for different applications.

The invention is also not restricted to the use of induction regulators as a means of obtaining variable and adjustable voltages, as other variable voltage transformers can be utilised for the purpose.

In this category tapped transformer windings can be used and these can be the secondary windings of separate regulating transformers or additional secondary windings of the main transformer shown in the examples.

An example of the latter arrangement is illustrated diagrammatically in Figure 5.

In this figure again, only the combined stator and rotor circuit of one phase system is schematically shown and the primary winding of the transformer T as well as the slip rings of the commutator machine M, if used as a frequency converter, are omitted for the purpose of simplification.

The secondary winding S of the transformer T is connected in zig-zag, the two coils of this winding shown in the diagram being arranged on two different cores.

The ends of the winding phase so obtained are connected to the ends of one winding phase of the stator winding St of the commutator machine M.

A further secondary winding SR is provided on the transformer T. This winding SR has a number of tappings that can be selectively connected to one commutator brush B in each phase on the commutator of the commutator machine M.

The other brush B of the same phase is connected to the central internal connection point $t'$ of the corresponding phase of the stator winding St. The point of connection $t^2$ between the zig-zag connected coils of the transformer secondary winding S is connected to a central tapping marked $\overline{3}$ of one phase winding of the regulating winding SR.

This phase winding of the regulating winding SR is accommodated on a third core of the transformer. Each phase system, i. e. each combined stator/rotor circuit therefore, comprises two half coils of the transformer secondary winding S on two cores and one phase winding of the further transformer secondary winding SR on the third core.

Figure 5A:
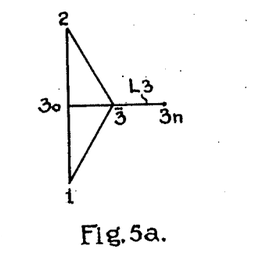
Figure 5a shows the voltage vector diagram of the arrangement according to Figure 5.

The result of this arrangement will be appreciated from the vector diagram Figure $5a$ which without requiring further explanation shows that the resulting stator voltage in the described arrangement is represented by the vector $1, 2$ end that the voltage introduced into the rotor circuit can be varied between zero, when using the tapping $3_0$ of the regulating winding SR, to $3_03_n$ when using the tapping marked $3_n$.

The number of intermediate steps depends on the number of tappings of the winding SR.

Alternative arrangements can be made according to the invention for using other systems and arrangements of tapped windings.

It will be seen that in accordance with the realisation of the invention, according to the principle as exemplified in Figure 5, that a separate induction regulator or a separate variable voltage transformer is not required.

I claim:

1. A multi-phase electrical system for the speed and voltage control of stator fed shunt A. C. commutator machines including frequency converters having a stator winding, a rotor winding, a commutator to which the rotor winding is connected and brushes for feeding the commutator, said system comprising a transformer having a primary winding fed from an A. C. supply and a secondary winding feeding the stator winding of the commutator machine, voltage regulating means having a winding system also fed from the transformer secondary winding for producing variable and adjustable voltages for the speed and voltage control of said commutator machine, and an electrical connection between one commutator brush of each phase of said commutator machine and an electrically-central internal connecting point in the corresponding phase of the stator winding to supply to the rotor of said commutator machine an adjustable voltage which is vectorially at right-angles to the resulting voltage of said stator winding and to obtain effective auto-transformer connections between the stator winding and the rotor winding of the commutator machine.

2. A multi-phase electrical system for the speed and voltage control of stator fed shunt A. C. commutator machines including frequency converters having a stator winding, a rotor winding, a commutator to which the rotor winding is connected and brushes for feeding the commutator, said system comprising a transformer having its primary winding fed from an A. C. supply, an electrically-central internal connection point in each phase of the stator winding of the commutator machine, an induction regulator having a wound stator and a wound rotor, the winding phases of the stator and rotor windings of said induction regulator being connected together for producing variable and adjustable voltages for the speed and voltage control of the commutator machine, both said stator winding of the commutator machine and said connected stator and rotor windings of the induction regulator being fed from the secondary winding of said transformer, an electrical connection between one commutator brush of each phase and said internal connection point in the corresponding phase of said stator winding of the commutator machine and an electrical connection between the other commutator brush in each phase and the connection between said connected induction regulator windings in the corresponding phase to supply to the rotor of the commutator machine, an adjustable voltage which is vectorially at right-angles to the resulting voltage of said stator winding of the commutator machine and to obtain effective auto-transformer connections between the stator and rotor windings of the commutator machine and the windings of said induction regulator.

3. A multi-phase electrical system for the speed and voltage control of stator fed shunt A. C. commutator machines including frequency converters having a stator winding, a rotor winding, a commutator to which the rotor winding is connected and brushes for feeding the commutator, said system comprising a transformer having its primary winding fed from an A. C. supply, and an intermediate internal connection point provided in each phase of its secondary winding, an electrically-central internal connection point in each phase of said stator winding of the commutator machine, two single-core induction regulators each having a primary winding and a secondary winding, said primary windings of said induction regulators being fed from said transformer, and said stator winding of the commutator machine being fed from said transformer secondary winding, through the secondary windings of said induction regulators, an electrical connection between one commutator brush in each phase and said electrically-central internal connection point in a corresponding phase of said stator winding, and an electrical connection between the other commutator brush of that phase and said intermediate internal connection point in the corresponding phase of the transformer secondary winding, to supply simultaneously to the stator and rotor windings of the commutator machine, adjustable voltages vectorially at right-angles to one another, and to obtain auto-transformer connections between the stator and rotor windings of the commutator machine and the windings of said induction regulators.

4. A multi-phase electrical system for the speed and voltage control of stator fed, shunt, A. C. commutator machines including frequency converters having a stator winding, a rotor winding, a commutator to which the rotor winding is connected and brushes for feeding the commutator, said system comprising a transformer having its primary winding fed from an A. C. supply, and an intermediate internal connection point provided in each phase of its secondary winding, an electrically-central internal connection point in each phase of said stator winding of the commutator machine, an additional secondary winding for said transformer, said additional winding being provided with tappings and being connected to said intermediate internal connection points of the first-mentioned transformer secondary winding, said stator winding of the commutator machine being fed from the first-mentioned transformer secondary winding, an electrical connection between one commutator brush in each phase and said electrically-central internal connection point in a corresponding phase of said stator winding, and an electrical connection between the other commutator brush of that phase and a tapping in the corresponding phase of the additional secondary winding of said transformer, to supply to the rotor of the commutator machine an adjustable voltage which is vectorially at right-angles to the resulting voltage of said stator winding, and to obtain auto-transformer connections between the stator and rotor windings of the commutator machine and the secondary windings of the transformer.

5. A multi-phase electrical system for the speed and voltage control of stator-fed, shunt, A. C. commutator machines, including frequency converters, as specified in claim 1, having zig-zag connections in the said transformer secondary winding, whereby to provide for supply to the rotor of said commutator machine, a constant voltage component vectorially at right-angles to the voltage of the stator winding of the commutator machine and additional to the specified adjustable voltage.

6. A multi-phase electrical system for the speed and voltage control of stator fed, shunt, A. C. commutator machines, including frequency converters, as specified in claim 1, including an additional winding on the transformer for feeding to the rotor of the commutator machine a constant voltage component in the speed-adjusting and magnetising direction.

7. A multi-phase electrical system for the speed and voltage control of stator-fed, shunt, A. C. frequency converters, as specified in claim 1, and applied to the speed control of stator fed A. C. motors, supplied with a variable voltage and frequency from the frequency converter, wherein the transformer has at least three legs, and a multi-phase secondary winding and a single phase primary winding, said primary winding being fed from a single phase A. C. supply and wherein said frequency converter serves also as a phase converter, by utilising the rotating magnetic field produced by said converter in operation, to induce multi-phase voltages in its stator winding, said multi-phase voltages being applied to the secondary winding of the transformer and to the windings of the voltage regulating means.

BENNO SCHWARZ.

References Cited in the file of this patent

UNITED STATES PATENTS

| Number | Name | Date |
|---|---|---|
| 2,480,054 | Schwarz | Aug. 23, 1949 |